Figure 1:
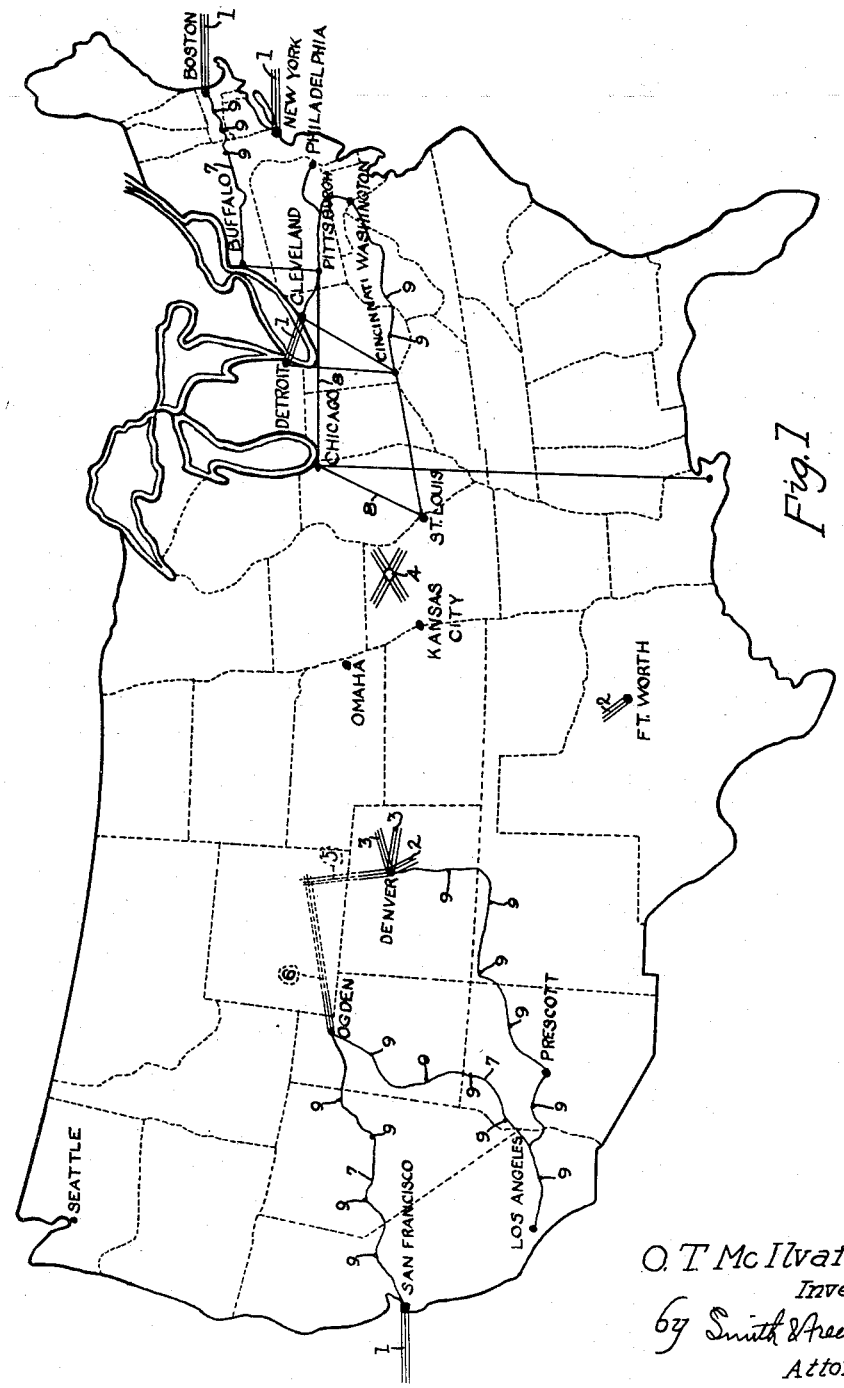
Figure 8:
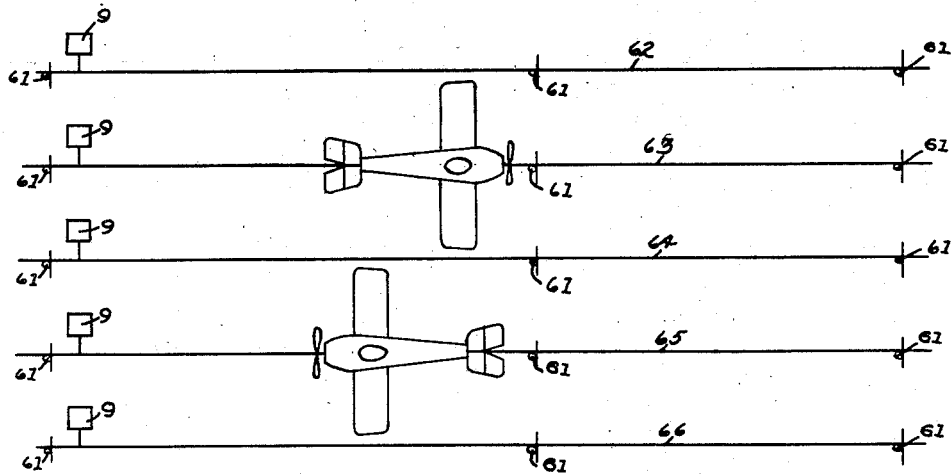

Jan. 6, 1931.   O. T. McILVAINE   1,787,992
AERIAL NAVIGATION AND PROTECTION
Filed Sept. 15, 1925   5 Sheets-Sheet 1

O. T. McIlvaine
Inventor
by Smith & Freeman
Attorneys

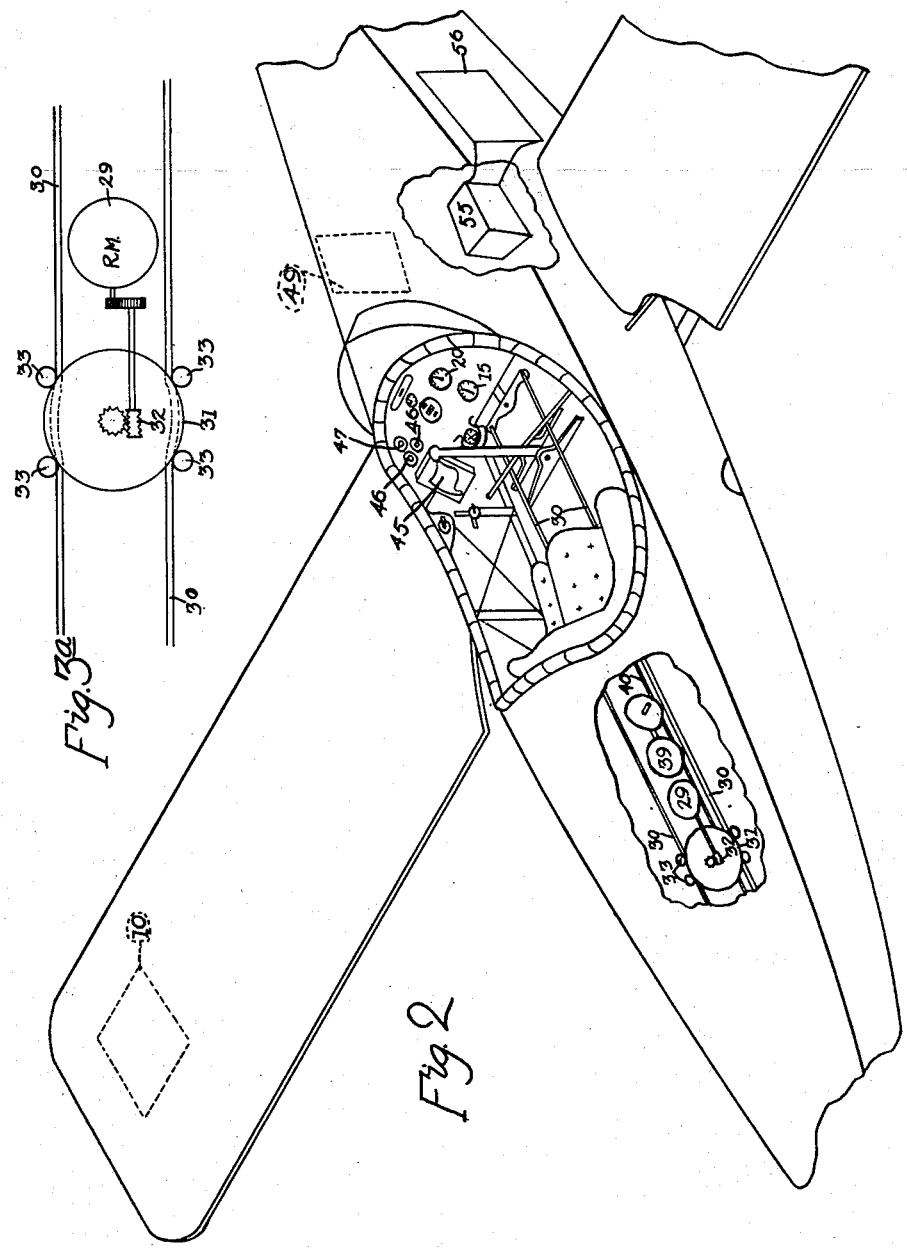

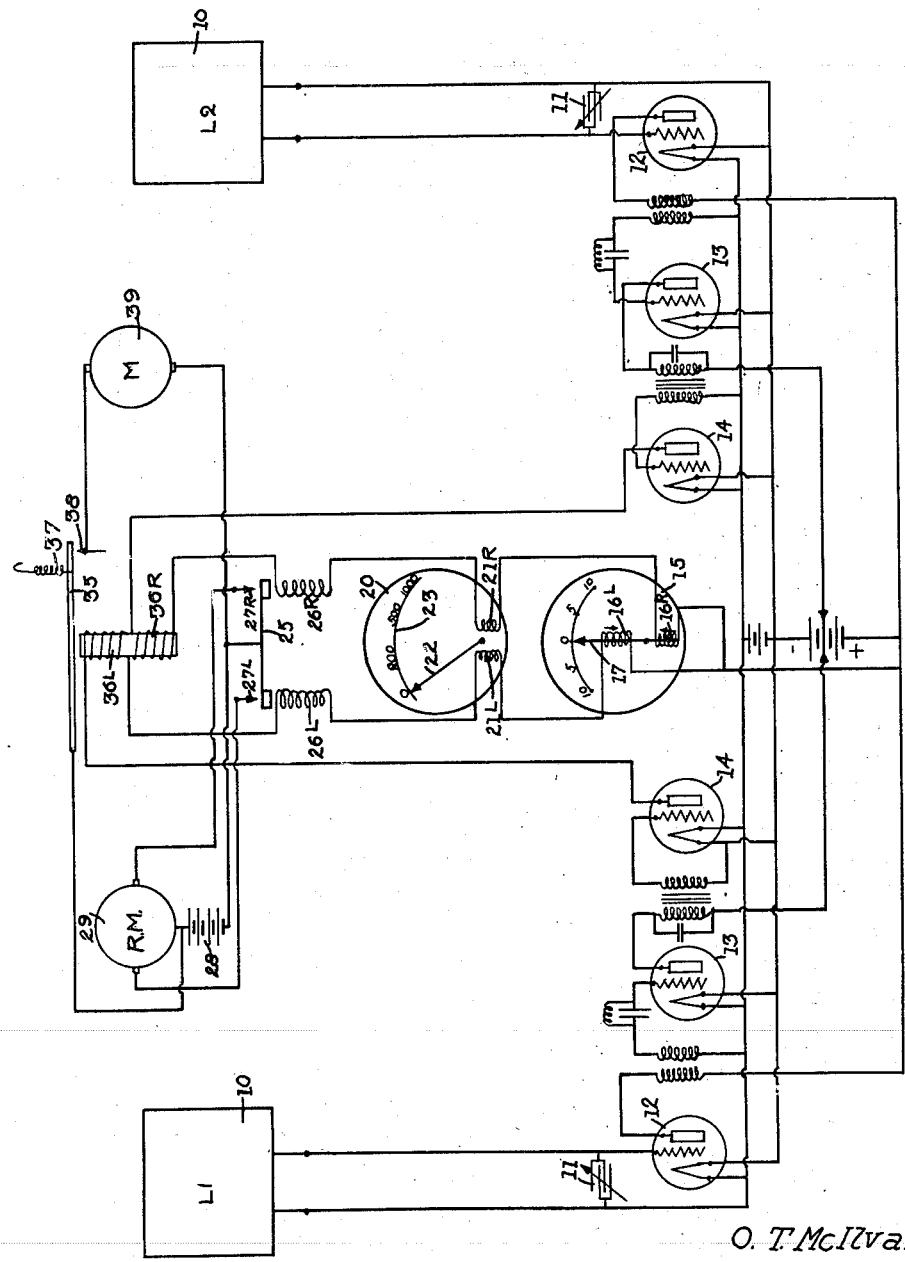

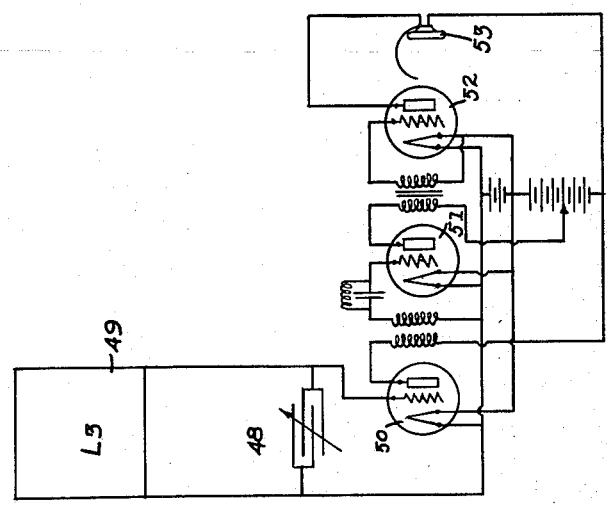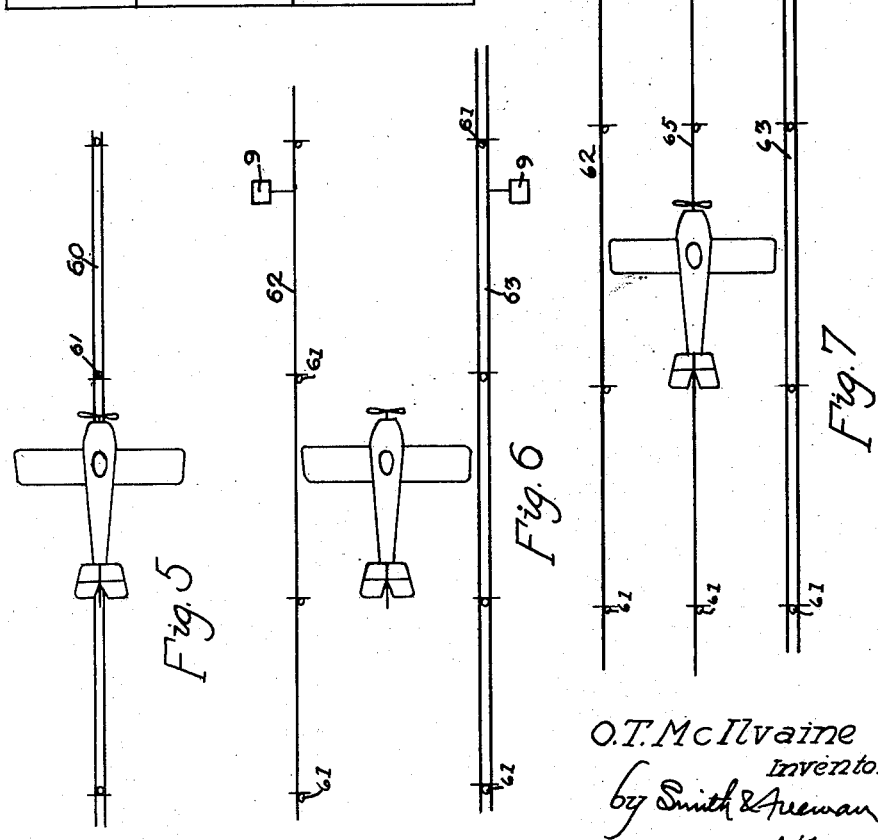

Patented Jan. 6, 1931

1,787,992

UNITED STATES PATENT OFFICE

ORAN T. McILVAINE, OF EAST CLEVELAND, OHIO, ASSIGNOR TO THE RADIO TELEVISION COMPANY, OF CLEVELAND, OHIO, A CORPORATION OF OHIO

AERIAL NAVIGATION AND PROTECTION

Application filed September 15, 1925. Serial No. 56,454.

This invention relates to aerial navigation, and its objects are the provision of new, practical and reliable means whereby the operator of an airship may be constantly informed of his whereabouts, regardless of light or weather conditions; the provision of further means for informing the operators of such craft of their proximity to land or to other craft; the provision of means employing the same apparatus for establishing communication between different craft or between such craft and fixed stations; the provision of means rendering the management of the craft partly automatic under certain conditions; while further objects and advantages of the invention will become apparent as the description proceeds.

In the case of night flying, for example such as the existing mail routes, elaborate lighting stations have been located at intervals, which lighting stations are expensive to maintain and of limited value in stormy or foggy weather. According to the present invention the route to be traversed is defined by ether waves restricted to a comparatively narrow region laterally but coextensive with the length of the route. This band of waves can be defined in either of two ways: (a) by projecting a definite narrow bundle or pencil of rays horizontally along the course from one or more stations located thereon; (b) by suitably charging one or more wires supported along the route. The former of these modes is particularly desirable in open, desert or sparsely settled country or over water-routes; the latter system is more convenient in the case of a tortuous route such as that through mountains or thickly settled country. This second system offers several secondary advantages, chief among which are the ease with which an altitude indicator or control can be combined therewith, and the facility with which inter-craft communication can be established. Another advantage resides in the fact that the field required is comparatively weak, and offers a minimum tendency to interfere with other apparatus, and also by falling off comparatively rapidly in a lateral direction serves to hold all craft more accurately to their course. The wired course is also less affected by atmospheric conditions.

Wide latitude is permissible in the number of wires employed. A single wire is enough for most purposes, except that it necessitates caution in meeting other craft as in a single track railroad. An increased number of wires can be employed if desired, as for example, all the wires carried by a telegraph or telephone company's right of way; it will be understood that these wires need not be restricted to the present use but can carry telegraph, telephone, or power current at the same time, and even a plurality of radio frequencies. In some cases, however, it is desirable to separate the wires laterally so as to define a wider strip of territory, in which event the waves guided thereby may be either of equal or unequal frequency, but preferably the latter so as better to define the lateral limits of the course as well as to assist meeting craft to avoid collision.

The functions of guidance and of altitude maintenance can be combined in one wire (or series of wires) or broken up between different conductors. Preferably the wave length employed on each route is sufficiently different from that employed on every other route to apprise the operator of each craft as to his geographical position at all times.

In order to utilize these wave bands each craft is equipped with certain apparatus essential to the reception of guidance, to which may be added further apparatus for altitude detection, communication, etc. This essential apparatus is the same for the free-wave route and the wired-wave route and comprises two similar reception antennæ carried by the craft in such position that when that craft is properly oriented in the prescribed lateral limits of the course the effect of the guiding waves thereon is equalized, these antennæ being connected to sensitive detecting apparatus in such wise that upon the occurrence of a predetermined degree of inequality in the field which energizes these antennæ, a suitable indicator is actuated; and according to one form of my invention this indication, when sufficiently strong, is caused to produce a biasing effect upon the steering mechanism.

Another refinement of my invention is to combine with this inequality detector an intensity detector which, when employed in connection with the wired-wave system shall indicate the approach of the craft to such wire, so that when employed in air craft for night or storm flying the pilot is apprised of a too close approach to the ground; and according to one form of my invention this indication, when sufficiently strong is caused to produce a biasing effect upon the elevation controls. The reception and transmission of messages preferably requires additional apparatus.

Figure 9:
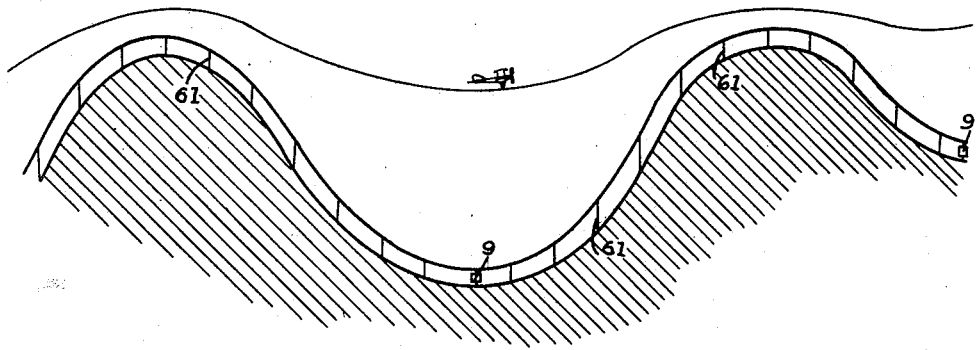

In the drawings accompanying and forming a part of this application I have illustrated the general principles of my invention and certain apparatus whereby the same may be utilized practically. Fig. 1 is a map of the United States showing the use of different forms of wave emitting and directing mechanisms according to the particular needs of the terrain; Fig. 2 illustrates part of an air-plane equipped with my improvements; Fig. 3 is a general diagram of the chief circuits; Fig. 3ª is a detail view of a rudder operating mechanism; Fig. 4 is a diagram of a listening circuit carried by the air-plane additional to the other circuits; Figs. 5 to 8 inclusive are diagrammatic views of one wire, two wire, three wire, and five wire systems; and Fig. 9 is a diagram showing a section of mountain installation.

While I do not limit myself to the use of any one system or arrangement herein shown as regards any particular location, it is generally best as shown in Fig. 1 to employ the free wave system as indicated at 1, 1 over bodies of water and as shown at 2, 3, over flat or desert country. In the former case it is necessary to have the source at the end of the route, either at one terminus as shown at Boston or at both termini as shown between Detroit and Cleveland. In overland free-wave routes the generating stations can similarly be located at both ends of the route as indicated at 2, 2 between Denver and Fort Worth, or at one end only as indicated at 3, 3, out of Denver; or it can be located in a central point as indicated at 4. In the case of long routes booster stations can be provided at intervals. This system can also be used in mountainous country as indicated at 5, 6, between Denver and Ogden, the different sections of the route intersecting. In all these cases the different routes are characterized by waves of different length so that changing from one to another can occur only as a result of deliberate choice on the part of the operator.

In complicated mountainous districts such as the Rockies and Appalachians or in thickly settled territory such as New York State, the wired system is preferable as indicated at 7, although this is also suitable in flat country as indicated at 8. In the case of a very long route or one through mountains it is advisable to have booster stations 9 at fairly short intervals to maintain the intensity of the waves approximately uniform. These booster stations being mere automatic oscillators of fixed wave length are inexpensive to construct and wherever current is available require no more attention than a transformer.

Each air-plane is equipped with the apparatus necessary to cooperate with these bands of radio waves. The first essential is a differential indicator adapted and arranged to indicate an inequality in the intensity of the field at opposite sides of the machine, caused either by one wing of the same passing outside the limits of the beam of free waves or by the craft getting to one side of the middle line defined by the wire or wires; this differential indicator is best made independent of the actual intensities involved.

Next in order of importance is an indicator for the intensity of the field. This is not so important in the case of the free wave installation but is chiefly valuable in connection with the wired system, where if rightly consulted it gives warning of approach to the ground.

Preferably combined with the first system is a system of relays operative whenever the differential becomes too great to energize a reversible motor operatively connected to the horizontal rudder; and preferably connected with the second system is a relay operative whenever the total intensity becomes too great to energize another motor connected to the vertical rudder.

In a preferred form of the invention the first named circuit comprises two antenna loops 10, 10, generally carried, one at the end of each wing of the air-plane as shown in Fig. 2, although this position is imperative only in the case of the free wave system. In the case of the wired systems, other positions are available. Each of these antennæ is connected through a variable coupling 11 to a suitable receiving and amplifying set. In Fig. 3 I have shown a series of three electronic tubes 12, 13, 14 on each side of the circuit, 12 being a radio frequency amplifier, 13 a detector, and 14 an audio frequency amplifier. I do not limit myself to this number of tubes nor to these steps. It is only essential that the currents induced in the respective antennæ be proportionately intensified, whereupon they pass through a differential indicator 15 carried by the instrument board. This device comprises essentially two coils $16^L$, $16^R$ so mounted as to carry the intensified current from the left and right antennæ, respectively, but to have an opposite effect upon the pointer 17, which accordingly remains unmoved so long as the intensities remain equal but swings to one side or the other with a force dependent upon their difference. This indication is sufficient to warn a watchful pilot to steer accordingly. Obviously the instrument can take many different forms and illuminating or other signal devices can be combined therewith.

Connected in series with this instrument I have shown the summational current-meter 20. This device comprises essentially two coils $21^L$, $21^R$, connected in series with the coils $16^L$ and $16^R$ respectively, and so arranged that the sum of their effects shall act upon the pointer 22 instead of their difference as in the former case. This pointer plays over a scale 23 which can be calibrated directly in feet in case care be taken to maintain the intensity of the waves substantially constant about the ground wire. Of course this instrument registers only the distance from the wire and this corresponds with the distance from the ground only when the craft is directly above the wire so that its readings are reliable only when the reading of instrument 15 is zero, and when the intensity of the field is uniform.

Next after the instrument 20 I have shown a differential relay comprising an armature 25 pivoted between two coils $26^L$, $26^R$, which are connected in series with the coils $21^L$, $21^R$, respectively. Upon a predetermined inequality in the strength of the two currents the armature is tipped to one side or the other so as to make contact at $27^L$ or $27^R$ and thereby establish a circuit through the battery 28 and reversing motor 29 which is suitably connected to the cables 30, 30, that control the horizontal rudder (not shown). While a great many arrangements to do this can be employed, the simplest is to pass these wires past the opposite sides of a grooved wheel 31 which is connected to the motor by a worm gear 32. The wires are held in frictional contact with the wheel by means of suitable guides 33 so that the motor can actuate the rudder without at the same time depriving the pilot of control in case he wishes to exercise it. It will be obvious that by making the friction sufficiently great or by other means the control can be given over completely to the motor if thought desirable.

Next after this differential relay I have shown a summational relay comprising an armature 35 mounted for the combined operation of coils $36^L$ and $36^R$ which are connected in series with the coils $16^L$ and $16^R$ respectively. When the combined effect of the current in these two coils is sufficient to displace this armature against the effect of the spring 37 and engage the contacts 38 a circuit is closed through the battery 28 and motor 39, which is suitably connected to the wire 40 leading to the vertical rudder (not shown), thereby causing the craft to rise in case the piolt has not already done so. I have not illustrated this as a reversible motor, but have left it to the pilot to bring the machine down again, although it is obvious that the two motors could be made the same, the armature 35 being spring-balanced in a central, non-contacting position corresponding to a predetermined elevation.

The instrument board is also preferably equipped with a map 45 showing the routes and their characteristic wave lengths, also with dials 46, 46 for the variable couplers 11, 11. In case of a free wave system or of a wire system having only a single wave length these two couplers can be attached to the same shaft and only one dial used, but the preferable system, as hereafter shown is one having plural wires and unequal wave lengths so that independent dials are preferable.

The instrument board is also preferably provided with an additional dial 47 attached to the coupler 48 by which a third antenna 49 is connected to an independent receiving set as shown in Fig. 4. I have also shown three tubes here, 50, 51, 52, and a head-set 53, although there are no essential limitations other than the practical ones of weight, cost, and complexity. I prefer to use a set exactly like a half of the main set, connected in parallel to the same batteries and using interchangeable tubes. The purposes of this receiving set are many, but primarily its object is to apprise the pilot of branch routes, established stations, and the proximity of other planes.

Preferably the wave lengths employed for this system are very short, much shorter than those used for commercial and entertainment broadcasting purposes, and shorter than those generally employed for the transmission of speech, so this set should not be confused with those ordinarily employed for communication purposes. The advantages of using short wave lengths are very numerous, among which are the facts that the apparatus is smaller and cheaper, the power required is less, the interference with other radio uses is smaller, and tuning is much more accurate.

As a result of the short wave lengths and the consequent accurate tuning the main guiding set is deaf to all other waves, so that in order to pick up other frequencies, as for example to know when to turn from one route to an intersecting route, the pilot may adjust his auxiliary set to the frequency of the route he desires to locate and listen until he reaches it, or he may employ a widely tuned circuit.

This also enables signals to be sent to him from the ground according to any prearranged plan either to inform him of his position or to convey instructions. To do this oscillators are located along the route, each oscillator arranged to send out intermittently a characteristic series of waves including in succession all the frequencies within the range of the plane sets. These sets have a still more important mission in warning the pilot of the proximity of other planes. To this end each plane is also equipped with an oscillator 55 whose antenna is illustrated at 56, this oscillator being arranged to send out only waves of a predetermined frequency, which is different from the route frequency so as not to affect the guiding set. Thus if two planes flying on a given route carry oscillators adjusted to different frequency and the head set of each is adjusted to the frequency of the other both pilots are warned of the approach of their planes, and can take safety measures accordingly.

In the case of a double track system such as is hereafter described, the oscillators are differently adjusted on the different tracks. This same arrangement of oscillator and receiver is also useful for preventing collisions between ships at sea, between successive trains on the same track, between automobiles and trains, and even between automobiles. All that is required is an oscillator carried by each ship, locomotive, or other danger unit, and a receiver carried by each other ship, train, motor car, etc. In the simplest form the oscillator has a fixed predetermined wave length, or in the case of railroads, one wave length for trains north and east bound and a second wave length for those west and south bound. The receivers are equally simple since they require no complicated, variable, nor adjustable features and by the use of any well known radio frequency relays a lamp can be illuminated or other danger signal produced, so that the head set is not required. As applied to the airplane I prefer the head set because of its other uses, but do not limit myself thereto.

The wire, when used, is supported by poles from which it is insulated in the customary way in telephone and telegraph practice. Indeed for purposes of economy it is best used for these purposes simultaneously with the use here described. In Fig. 5 I have shown a one wire system, the wire at 60 and the poles at 61. The wire is generally in many separate and separately insulated strands but all strands carry the same radio waves, while the normal route of the air plane is directly overhead.

In Fig. 6 I have shown a two wire system, the wires at 62, 63 and the poles at 61. I have indicated only a single wire at 62, but a plurality of wires at 63. This is a better system than the first because the wires 62 and 63 carry unequal frequencies and the two loops $10_L$, $10_R$ are tuned accordingly. The wires 62 and 63 are preferably about ¼ mile apart although any width from a few hundred feet to five miles or more is usable. This two wire system has the double advantage of a more pronounced inequality of intensity between the two sides and the fact that the intensity is definitely oriented. With the single wire system the indication of the instrument is the same whichever be the direction of flight. With the two wire system it is very different.

The two wire system has no provision for altitude indication, wherefore a third wire 65 is preferably added as in Fig. 7 for this sole purpose. To facilitate two way traffic the best plan is that shown in Fig. 8 employing five parallel spaced wires, 62, 63, 64, 65, 66, all carrying radio waves of different frequencies. The middle wire, 64, is common to the two routes while the wires next to it on both sides are altitude wires. Collisions between properly equipped planes on such a route is very unlikely.

In all two wire systems it is best to locate the boosters opposite each other, as shown at 9 in Figs. 6 and 9, not only for convenience but to maintain the fields at equal intensity at corresponding points.

The location of these boosters along the line is best chosen with respect to the topography of the country. The effect of each booster is to increase the intensity very markedly adjacent thereto, thus actuating the altitude indicator in the same way that approach to the ground would do, and in flat country the same are located at equal regular intervals so as to constitute a kind of mile post and by their regularity prevent the pilot from becoming confused. In mountainous country, however, the same are preferably located in the valleys as shown in Fig. 9, so that the height of equal field intensity may approximate a level line and assist the maintenance of a straight course. In case the valleys be of unequal depth and frequency the boosters are made of correspondingly gauged power.

The cost of such a system as is herein described is very low as compared with the cost of maintaining and operating signal beacons at short distances and the same has the further advantage of being equally operative at all times of day and under all conditions of weather. It will be understood, however, that all features of the system are not of equal importance and need not be used together. For example the guiding may be employed without the altitude indicator; the mechanical controls for the rudders may be eliminated, or the visible reading instruments can be omitted, or other signals substituted; the proximity indicator may be omitted or may be used alone; and many other changes can be made within the scope and purview of my invention, wherefore I do not limit myself except as specifically recited in my several claims which I desire may be construed each independently of limitations contained in other claims.

Having thus described my invention what I claim is:

1. The method of navigating aircraft through mountainous country under conditions of low visibility which consists in conducting radio waves along the established route following the vertical contour of the terrain, augmenting the intensity of the waves in the valleys so as to maintain the region of uniform intensity substantially level, guiding the craft laterally within the limits of such waves, and simultaneously maintaining the craft at an elevation depending upon the intensity of such waves.

2. In aerial navigation, the combination with two equal antennæ and radio reception circuits connected thereto, of a differentially wound indicating instrument connected in both circuits and adapted to indicate the difference in strength of the radio waves for which the respective circuits are tuned, and a summationally wound indicating instrument connected in both circuits and adapted to indicate the combined strength of such radio waves.

3. In aerial navigation, the combination with aircraft, of two equal antennæ carried in bilaterally equivalent positions thereon and radio reception circuits connected thereto, of a differential relay connected in both circuits and adapted to close one or the other of two contacts depending upon a predetermined difference in the intensity of the radio waves for which the respective circuits are tuned, a second relay connected in both circuits and adapted to close other contacts upon the occurrence of a predetermined total current in one or both circuits, a reversible motor connected in circuit with said first contacts, a second motor in circuit with said last contacts, a horizontal rudder operatively connected to said first motor, and a vertical rudder operatively connected to said second motor.

4. In aerial navigation, the combination with aircraft, of two equal antennæ carried in bilaterally equivalent positions thereon and radio reception circuits connected thereto, of means responsive to the combined intensity of the radio waves about the respective antennæ for operating the vertical steering mechanism.

5. In aerial navigation, the combination with a conductor disposed along the earth's surface, and insulated therefrom, said conductor following the vertical contour of the earth's surface, sources of radio waves connected to the conductor and located in the valleys, a receiving circuit carried by the aircraft and tuned to such waves, and navigating instruments carried by said craft in said circuit, said instruments including elevation apparatus which operates by reference to the intensity of the wave field.

In testimony whereof I hereunto affix my signature.

ORAN T. McILVAINE.